W. N. VENNER.
APPARATUS FOR MACHINING HELICAL SURFACES SUCH AS THOSE OF PROPELLERS AND PROPELLER BLADES.
APPLICATION FILED APR. 6, 1906.

900,804.

Patented Oct. 13, 1908.
2 SHEETS—SHEET 1.

Witnesses
P. W. Bommers
M. E. Beall.

Inventor
William Nunn Venner
by Henry Orth Jr.
Atty.

W. N. VENNER.
APPARATUS FOR MACHINING HELICAL SURFACES SUCH AS THOSE OF PROPELLERS AND PROPELLER BLADES.
APPLICATION FILED APR. 6, 1906.
900,804.
Patented Oct. 13, 1908.
2 SHEETS—SHEET 2.
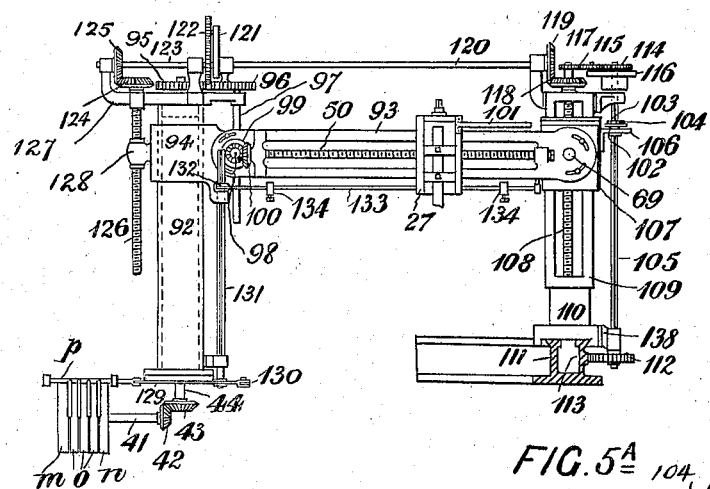
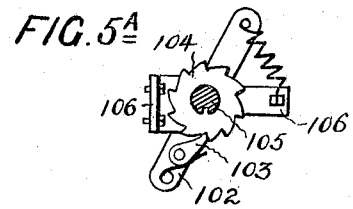
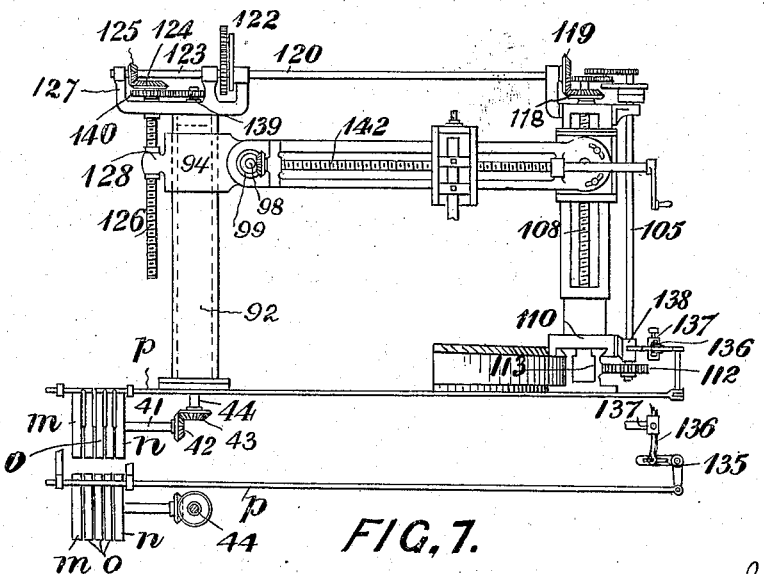
Witnesses.
D. N. Sommers
M. E. Beall.
Inventor
William Nunn Venner
by Henry Orth Jr.
Atty.

UNITED STATES PATENT OFFICE.

WILLIAM NUNN VENNER, OF BROCKLEY, ENGLAND.

APPARATUS FOR MACHINING HELICAL SURFACES, SUCH AS THOSE OF PROPELLERS AND PROPELLER-BLADES.

No. 900,804.   Specification of Letters Patent.   Patented Oct. 13, 1908.

Application filed April 6, 1906. Serial No. 310,371.

*To all whom it may concern:*

Be it known that I, WILLIAM NUNN VENNER, a subject of the King of Great Britain, residing at 28 Rokeby road, Brockley, in the county of Kent, England, have invented new and useful Improvements in Apparatus for Machining Helical Surfaces, such as Those of Propellers and Propeller-Blades, of which the following is a specification.

This invention relates to improved apparatus for machining large helical surfaces such as those of propellers or propeller blades, in which the work is fixed and the tool is carried on a saddle which reciprocates or slides on a radial bar or cross head adapted to revolve or oscillate and to move in a vertical direction, the tool consequently either cutting in a radial direction while the feed takes place in the direction of the pitch or the cut being in the direction of the pitch while the feed takes place in a radial direction.

Figure 1:
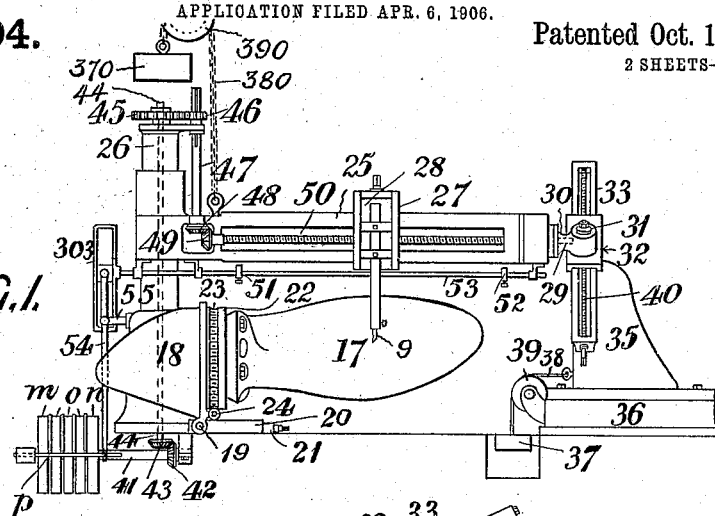
Figure 2:
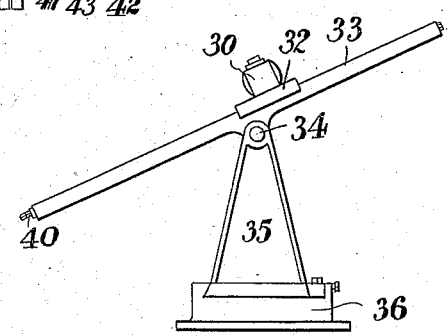
Figure 3:
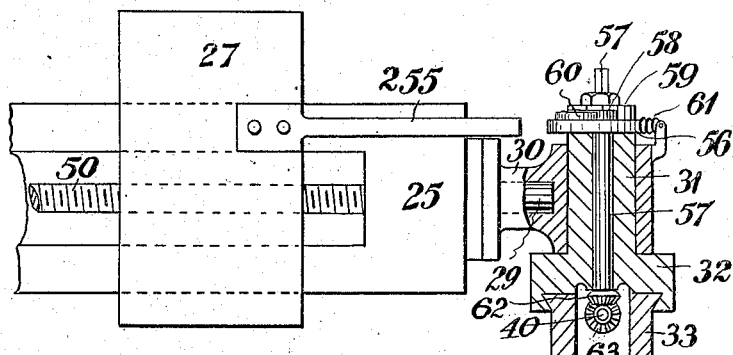
Figure 4:
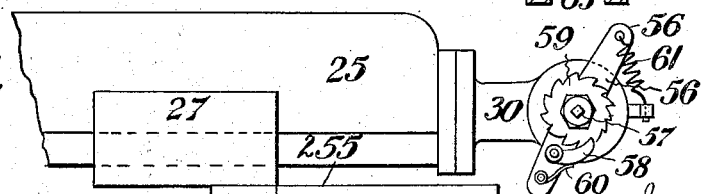

Figure 1 is an elevation of an apparatus constructed according to this invention in which the tool reciprocates rapidly in the radial direction on a radial arm which moves slowly in the direction of the pitch to take the feed. Fig. 2 is a side elevation of a part of the apparatus. Fig. 3 is a detail in sectional elevation showing how the radial bar or cross head is fed in the direction of the pitch by gearing from the main shaft and Fig. 4 is a plan thereof. Fig. 5 is an elevation of a modification. Fig. 5ª is a detail in plan, to a larger scale. Fig. 6 is a similar view of a modified construction of apparatus in which the tool is adapted to be fed in a radial direction while the radial arm moves backwards and forwards in the direction of the pitch, and Fig. 7 is a detail plan view showing means for altering the direction of movement of the radial arm.

In carrying the invention into effect, the propeller or as shown the propeller blade 17, see Figs. 1 and 2, is fixed to a suitable fixed bed or on the ground or to a bracket 18, and if the machine be required for machining blades only, the bracket 18 is adapted to be adjusted to any angle to suit the lean aft of the propeller blade, by for example pivoting it at 19 to the saddle 20 of a slide rest 21; the bracket is provided with a revoluble face plate 22 having a worm wheel 23 engaging with a worm 24 mounted in bearings in the bracket for the purpose of facilitating the setting up of the propeller blade 17.

The machine is provided with a cross head or radial bar marked 25, which is arranged to move up and down on a standard or column marked 26 and to oscillate or partially revolve thereon. This radial bar or cross head 25 has mounted thereon a saddle 27 having a slide rest 28 on to which the tool 9 is clamped and the said saddle is adapted to slide backwards and forwards on the radial bar or cross head so that the cuts on the propeller blade are taken in a radial direction, suitable means being provided which will be described later on. The radial bar or cross head 25 is adapted to move up and down on the column or standard 26 by sliding freely thereon. The amount of movement in the vertical plane being according to the vertical movement resulting from the movement of the saddle 32 up or down the inclined pitch piece 33, to be hereinafter described. The weight of the radial bar and parts connected thereto is supported at the end of the column by, for example, a counterweight 370 having a chain 380 passing over a pulley 390 suspended from the roof or other fixed part, and said bar is adapted to revolve or oscillate more or less by suitable means on the standard.

To machine the blade of the propeller in lines radiating from the center of the standard, while the feed takes place in the direction of the pitch, that is to say in both horizontal and vertical planes, the radial bar or cross head 25 is mounted so as to be capable of freely moving up and down the central column or standard by means of the screw 126, as hereinafter described with reference to Fig. 5 while the outer end of the said bar is provided with a stem 29 mounted in a sleeve 30 connected by a joint 31 to a saddle 32 or the like adapted to be moved backwards and forwards in or, for example, on a bed or guide 33 with V pieces for example serving as a means for determining the pitch. This bed, hereinafter called the "pitch piece" 33, is mounted on a horizontal pivot 34 and is adapted to be moved to, and clamped at, any angle to fix the pitch because the radial bar 25, is oscillated or moved backwards and forwards and the saddle 32 is moved on the pitch piece 33.

In order that that part of the pitch piece on which the saddle is resting, shall always be at the same distance from the axis of the pivot of the radial bar, which is also the axis of the column 26, the pitch piece 33 is mounted on a standard 35 adapted to slide in the V's of a fixed bed 36.

The pitch piece is provided with a counterweight 37 and chain 38 passing over the pulley 39 for the purpose of keeping the standard 35 at the same radial distance from the center of the column 26.

Motion is communicated to the saddle 32 by a screw 40 and the usual nut (not shown), and by an ordinary handle for turning the screw 40 by hand in any convenient and well-known manner.

Motion is communicated to cause the saddle 27 to move backwards and forwards on the radial arm 25 by means of a shaft 41 having fast pulleys m and n and loose pulleys o, strap shifting rod p and a miter wheel 42 which gears with another miter wheel 43 keyed to a shaft 44 revolving in bearings in the column 26. The upper end of this shaft 44 is provided with a spur wheel 45 gearing with another spur wheel 46 adapted to slide on but to revolve with another shaft 47 which by miter wheels 48 and 49 drives the screw 50 which revolves in the nut in the saddle 27 on the radial bar 25.

In order to effect the movement of the strap shifting rod the saddle 27 is for example adapted to come into contact alternately with the adjustable stops 51 and 52 adjustably mounted on the sliding rod 53 which has a T-link 303 within the slot of which engages a pin on the end of the striking lever 54 which is connected to the rod p and has its fulcrum in the bracket 55 fixed to the column of the machine.

The feed of the tool may also be effected by motion transmitted from the main shaft and a convenient way for carrying this into effect consists for instance, of a stop 255 (see Figs. 3 and 4) mounted on the saddle 27 on the radial arm 25, which stop comes into contact with a pawl lever 56 loose on a short shaft 57, the said pawl lever having a pawl 58 pivoted thereto which is held against the pawl wheel 59 by a spring 60. The pawl wheel 59 is keyed to the short shaft 57. The lever 56 is attached to a lug on the sleeve 30 by a spring 61 so as to bring the said lever back to its normal position when the stop 255 releases it. The short shaft 57 has mounted thereon a miter wheel 62 which gears with a miter wheel 63 screwed internally to fit the screw 40 and held in bearings within the saddle 32 so as to be capable of sliding therewith, the screw being fixed. The upper end of the short shaft 57 is conveniently provided with a square for a handle for causing the traverse of the saddle 32 on the pitch piece 33 by hand.

If desired, the vertical motion may be given to the radial bar or cross head from gearing situated in or near the column as shown in Fig. 5 which gearing comprises fast pulleys m and n and loose pulleys o, mounted on a driving shaft 41 having keyed thereon a miter wheel 42 gearing with another miter wheel 43 keyed to the vertical shaft 44 adapted to revolve in bearings within the column 92 which is adapted to oscillate with the radial bar 93. The latter is pivoted to the sleeve 94 which is capable of sliding up and down on the said column and the upper end of the shaft 44 is provided with a spur wheel 95 gearing with another spur wheel 96 which is keyed so as to be axially slidable on a shaft 97. This shaft by means of a pair of miter wheels (not shown) at the back of and adapted to travel with the radial bar, drives a spindle 98 having keyed thereon a miter wheel 99 gearing with another miter wheel 100 keyed to the screw 50 which imparts rapid motion to the saddle 27 by a nut within the said saddle but not shown which saddle thus receives a to and fro sliding motion on the radial bar 93.

The saddle is suitably provided with an adjustable rod 101 which is adapted to come into contact with a pawl lever 102 when the saddle 27 reaches the end of its forward stroke. The pawl lever has a pawl 103 pivoted thereto shown more clearly in Fig. 5ᵃ and held up to a ratchet wheel 104 provided with a feather and adapted to slide on a shaft 105. The pawl lever is loosely mounted on the said shaft and is supported by a bracket 106 fixed to the saddle 107 to which the outer end of the radial arm 93 is adjustably connected. This saddle 107 has a nut (not shown) in which works a screw 108 to cause the saddle and with it the outer end of the radial bar to ascend or descend according to the direction in which the said screw revolves. The saddle 107 at the end of the radial arm 93 is adapted to slide up and down on a vertical standard or slide 109 provided with a saddle 110. The latter is mounted on a partly circular bed 111, the curve of which is struck from the center of the column 92. The shaft 105 is caused to revolve a fraction of a revolution each time the adjustable rod 101 strikes the pawl lever 102 and the spur wheel 112 keyed to the shaft 105, and gearing with the rack 113, causes the saddle 110 to move a certain distance along the bed 111. When the shaft 105 revolves, it also communicates motion, by change wheel gearing such as 114 and 115 mounted on a quadrant 116, to a spur wheel 117, keyed to the upper end of the screw 108, so that the radial bar receives a small motion in a horizontal and also in a vertical plane corresponding to the pitch of the propeller. In order that the other or inner end of the radial bar may receive a corresponding motion in the vertical plane, the screw 108 has also mounted thereon a miter wheel 118 gearing with another miter wheel 119 mounted on a shaft 120. The inner end of this shaft is also provided with a quadrant 121 and by means of change wheels 122 motion is communicated to a shaft 123 carrying a miter wheel 125, and the latter gears with another miter wheel 124 which is mounted on a screw 126 revolving in bearings in a bracket 127 fixed to the upper end of the column 92, which screw passes through a nut 128 mounted in a lug on the sliding sleeve 94.

In order that reciprocating motion may be communicated to the saddle 27 on the radial bar 93, fast pulleys $m$ and $n$ and loose pulleys $o$ are provided and the strap shifting rod $p$ is operated by a connecting rod 129 which by a lever 130 on a shaft 131 receives motion by another lever 132 keyed to the same shaft from a rod 133 mounted in bearings on the radial bar 93 and having adjustable stops 134, 134. The shaft 131 is provided with a feather way and the lever 132 with a feather, but the lever is free to move up and down on the shaft 131 with the radial arm 93. The saddle 27 comes into contact with one of these stops at each end of its travel and by the mechanism aforesaid reverses the direction of revolution of the shaft 41. Thus the gearing situated in or near the column being properly proportioned and connected to the gearing for imparting slow partial revolving or oscillating motion to the radial bar (the cut being taken in a radial direction) gives a slow motion to the tool in the direction of the pitch by means such as the spur wheel 112 and the rack 113 and screws such as 126 and 108 driven by gearing and nuts connected to or made in one with the radial bar so as to communicate motion to the radial bar at or near the axis of the column and also at the outer end thereof in such manner that a definite and corresponding motion may be given to the radial bar at both ends.

The construction shown in Figs. 6 and 7 is very similar except that the radial bar receives a rapid oscillating motion in the direction of the pitch, the tool takes cuts in the direction of the pitch, instead of radially as in the last example and the feed is consequently taken in a radial direction. The shaft 44 is, as before, driven by fast pulleys such as $m$ and $n$ and provided with loose pulleys $o$ and is further provided with a strap shifting rod such as $p$ before described. This strap shifting rod is connected by a slotted bell crank lever 135 with a sliding bar 136 provided with adjustable stops 137, 137, so that when bracket 138 of the saddle 110 comes into contact with a stop 137 the bar 136 is moved and by the bell crank lever 135 communicates motion to the strap shifting rod $p$ with the result that the radial bar is oscillated and as the screws 126 and 108 are also driven by gearing from the shaft 44 that is to say, the screw 126 is driven by gearing 139 and 140 and the screw 108 is driven from the screw 126 by means of the gearing 124, 125, the shaft 123, spur gearing 122 for communicating the same or a different speed to the shaft 120 (according as the pitch of the propeller blade is to be uniform or variable) and miter wheels 119 and 118, the latter of which is mounted on the screw 108. The pinion 112 gearing with the rack 113 on the bed is suitably driven by means of change speed gear marked 141 receiving motion from the screw 108 and communicating motion to the shaft 105 of the pinion 112. Motion is communicated to the screw 142 on the radial arm by a handle as shown or if desired by any suitable automatic means to give the feed to the tool.

What I claim as my invention, and desire to secure by Letters Patent is:—

1. Apparatus for machining helical surfaces such as those of propellers and propeller blades, comprising means for holding the work in position, two standards, a radial bar or cross head to move in the direction of the pitch being mounted on one standard so as to oscillate in a horizontal plane on the axis of the said standard and simultaneously to move up and down on said standard, whereby the resultant motion of the radial bar follows the direction of the desired pitch line of the helical surface in every vertical plane thereof, the said radial bar being supported at its other end by the other standard, a driving shaft, means for causing said shaft to revolve in either direction, positive gearing for causing the motion of the radial bar or cross head in the direction of the pitch of the propeller, a saddle for the tool adapted to slide on said radial bar and means for communicating motion to said saddle, substantially as set forth.

2. Apparatus for machining helical surfaces such as those of propellers and propeller blades comprising means for holding the work in position, two standards, a radial bar or cross head adapted to move in the direction of the pitch of the propeller, being mounted on one standard so as to be free to oscillate in a horizontal plane on the axis of the said standard and also to move up and down on said standard, the said radial bar being supported at its other end by the other standard, a bed on which said standard is adapted to slide, a driving shaft, means for causing said driving shaft to revolve in either direction, positive gearing for causing the motion of the radial bar or cross head in the direction of the pitch, a saddle for the tool adapted to slide on said radial bar and gearing for communicating motion to said saddle substantially as set forth.

3. Apparatus for machining helical surfaces such as those of propellers and propeller blades, comprising means for holding the work in position, two standards, a radial bar or cross head adapted to move in the direction of the pitch of the propeller, being mounted on one standard so as to be free to oscillate in a horizontal plane on the axis of the said standard and also to move up and down on said standard, the said radial bar being supported at its other end by the other standard, a bed concentric with the first standard and on which the second standard is adapted to slide, a driving shaft, means for causing said driving shaft to revolve in either direction, positive gearing for causing the motion of the radial bar in the direction of the pitch of the propeller, a saddle for the tool adapted to slide on said radial bar and gearing for communicating motion to said saddle substantially as set forth.

4. Apparatus for machining helical surfaces such as those of propellers and propeller blades comprising means for holding the work in position, two parallel standards, a radial bar or cross head adapted to move in the direction of the pitch of the propeller, being mounted on one standard so as to be free to oscillate in a horizontal plane on the axis of the said standard and also to move up and down on said standard, the said radial bar being adapted at its other end to slide up and down on the second standard, a bed concentric with the first standard and on which the second standard is adapted to slide, a driving shaft, means for causing said driving shaft to revolve in either direction, positive gearing for causing the motion of the radial bar in the direction of the pitch, a saddle for the tool adapted to slide on said radial bar and gearing for communicating motion to said saddle substantially as set forth.

5. Apparatus for machining helical surfaces such as those of propellers and propeller blades, comprising means for holding the work in position, two parallel standards, a radial bar or cross head adapted to move in the direction of the pitch of the propeller being mounted on one standard so as to be free to oscillate in a horizontal plane on the axis of said standard and also to move up and down in a vertical plane on said standard, the said radial bar being adapted at its other end to slide up and down on the second standard, means for adjusting the radial arm so that the angle it forms with the first standard may be varied, means for clamping said radial bar in position, a horizontal bed concentric with the first standard and on which the second standard is adapted to slide, a driving shaft, means for causing said driving shaft to revolve in either direction, positive gearing for causing the motion of the radial bar in the direction of the pitch, a saddle for the tool adapted to slide on said radial bar and gearing for communicating motion to said saddle substantially as set forth.

6. Apparatus for machining helical surfaces such as those of propellers and propeller blades, comprising a central standard or column adapted to oscillate on its axis, another standard adapted to move in a curve around the axis of the central column, a part circular horizontal bed on which the outer standard is adapted to slide, a radial bar or cross head mounted on the said column and standard and adapted to slide in a vertical plane thereon, a saddle for the tool adapted to reciprocate on said radial arm, means for adjusting the radial arm so that the angle it forms with the column may be varied, means for clamping said radial arm in position, a driving shaft, means for causing said driving shaft to revolve in either direction, gearing for communicating motion from the driving shaft to the saddle for the tool and positive gearing operated by the saddle when it reaches one end of its stroke for communicating motion to cause the radial bar to move in a vertical plane and in a horizontal plane substantially as set forth.

7. Apparatus for machining helical surfaces such as those of propellers and propeller blades, comprising a central standard or column adapted to oscillate on its axis, another standard adapted to move in a curve around the axis of the central column, a part circular horizontal bed on which the second standard is adapted to slide, a radial bar or cross head pivoted at one end to a sliding sleeve on the central column and at the other end to a slide mounted on a saddle on the second standard, means for fixing the said cross head to the said sliding sleeve and the said saddle, the said sliding sleeve, the said saddle, another saddle for carrying the tool and adapted to reciprocate on said radial arm, a driving shaft, means for causing said driving shaft to revolve in either direction, gearing for communicating motion from the driving shaft to the saddle for the tool and positive gearing operated by the saddle when it reaches one end of its stroke for communicating motion to cause the radial bar to move in a vertical plane and in a horizontal plane simultaneously substantiallly as set forth.

8. Apparatus for machining helical surfaces such as those of propellers and propeller blades, comprising a central standard or column adapted to oscillate on its axis, another standard adapted to move in a curve around the axis of the central column, a part circular horizontal bed on which the second standard is adapted to slide, a radial bar or cross head pivoted at one end to a sliding sleeve on the central column and at the other end to a slide mounted on a saddle on the second standard, means for fixing the said cross head to the said sliding sleeve, the said saddle, another saddle for carrying the tool and adapted to reciprocate on said radial arm, a driving shaft, gearing for causing said driving shaft to revolve in either direction, gearing for communicating motion from the driving shaft to the saddle for the tool, means operated by the said tool saddle when it reaches each end of its stroke to operate the said reversing gear and positive gearing operated by the saddle when it reaches one end of its stroke for communicating motion to cause the radial bar to move on and with the said standards in a vertical plane and in a horizontal plane simultaneously, substantially as set forth.

9. Apparatus for machining helical surfaces such as those of propellers and propeller blades, comprising means for holding the work in position, a radial bar or crosshead capable of oscillatory movement about an axis and simultaneously of movement parallel to said axis, positive gearing for so proportioning the two movements that the resulting motion of the radial bar follows the direction of the desired pitch line of the helical surface in every plane thereof at right angles to said axis, a saddle for the tool adapted to slide on said radial bar, and means for communicating motion to said saddle, substantially as set forth.

WILLIAM NUNN VENNER.

Witnesses:
V. JENSEN,
H. D. JAMESON.